(No Model.)

D. N. HURLBUT.
CONDUIT OR OTHER PIPE.

No. 353,680. Patented Dec. 7, 1886.

Witnesses:
O. W. Bond.
Harry T. Jones.

Inventor:
Daniel N. Hurlbut

UNITED STATES PATENT OFFICE.

DANIEL N. HURLBUT, OF CHICAGO, ILLINOIS.

CONDUIT OR OTHER PIPE.

SPECIFICATION forming part of Letters Patent No. 353,680, dated December 7, 1886.

Application filed August 17, 1886. Serial No. 211,177. (No model.)

*To all whom it may concern:*

Be it known that I, DANIEL N. HURLBUT, residing at Chicago, in the county of Cook and State of Illinois, and a citizen of the United States, have invented a new and useful Improvement in Conduit or other Pipes, of which the following is a full description, reference being had to the accompanying drawings, in which—

Figure 1:
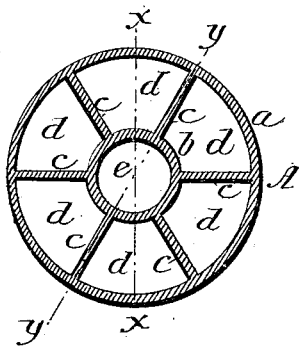
Figure 2:
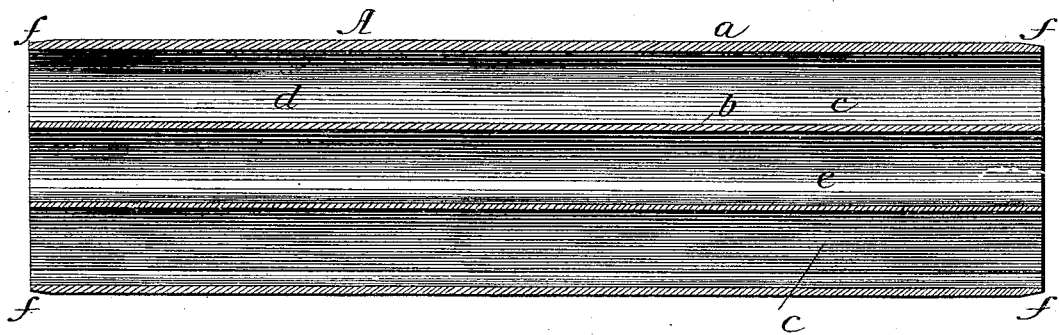
Figure 3:
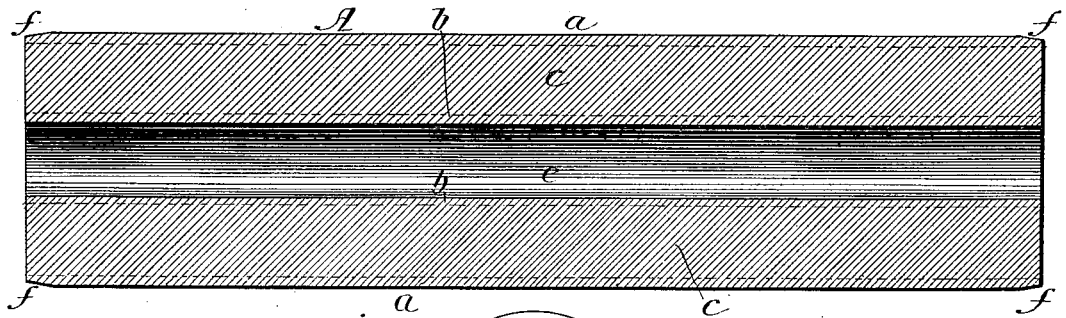
Figure 4:
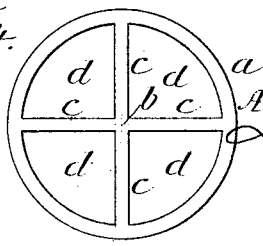

Figure 1 is a cross-section; Fig. 2, a longitudinal section on line $xx$ of Fig. 1; Fig. 3, a longitudinal section on line $yy$ of Fig. 1; Fig. 4, an end elevation showing a conduit or pipe with four passages or compartments.

This invention relates to conduits or pipes primarily designed for receiving electrical cables or wires, but which can be used for other purposes where it is desirable or necessary to have a series of compartments or passages divided one from the other in the same conduit, and has for its object to make a conduit or pipe in cylindrical form, having separate passages or compartments, from fire-clay which can be burned or vitrified to have surfaces that will be impervious to air or moisture and have the conduit or pipe retain its shape during the process of burning or vitrifying; and its nature consists in a conduit or pipe formed of clay adapted to be burned or vitrified, and consisting of an exterior and interior rim or wall, the two walls being united by partitions formed with the walls and corresponding in thickness to the thickness of the walls, forming, when burned or vitrified, a conduit or pipe with passages or compartments, all as hereinafter more specifically described, and pointed out as new in the claims.

In the drawings, A represents a section of the conduit or pipe, formed of fire-clay which can be burned and vitrified to form a material which will be impervious to air and moisture, and one section can be connected with another section to form a conduit or pipe of any desired length. The pipe-section has an exterior wall, $a$, and an interior wall, $b$, with division-walls or partitions $c$, running from the inner wall to the outer wall the full length of the section, as shown in the drawings, and the walls $a$ $b$ and partitions $c$ correspond in thickness, or nearly so, one with the other, and the juncture of the division-walls with the exterior and interior walls is shaped so that the walls or partitions $c$ will be of a corresponding thickness at their juncture with the walls $a$ $b$, as to their general thickness. The interior wall, $b$, has a central longitudinal opening, $e$, in the form of construction shown in Figs. 1, 2, and 3; but, as shown in Fig. 4, the division-walls or partitions $c$ run to a common center, $b$, where they are joined one with the other. The inner and outer walls, in connection with the division-walls, form passages or compartments $d$, each separate and distinct by itself, and the number and size of these passages or compartments $d$ can be changed by increasing or diminishing the number of division-walls or partitions and the diameter of the interior and exterior walls of the conduit or pipe. As shown, each end of the section is formed with a taper or incline, $f$, to facilitate the entering of the end of the section into the encircling or packing ring, by which one section is connected with another to form a continuous conduit or pipe of the desired length.

Heretofore it has been attempted to produce a conduit or pipe having separate passages or compartments formed of round holes and made from fire-clay; but in such attempts it has been found impossible, or nearly so, to run a cylindrical pipe having round holes from a die, owing to the inequality in the thickness of the walls, and even if practical and possible to form such pipe, it would be found in practice that in burning and vitrifying the clay the sections of pipe are warped or drawn out of shape and cracked to such an extent that, in putting the sections together to make a continuous conduit or pipe, a perfectly air-tight and water-proof pipe cannot be made, owing to the irregularities between the sections, which do not permit of a true and accurate fit. These defects in the production of a divided conduit or pipe from fire-clay burned and vitrified arise mainly, if not entirely, from the circular form of the passages or compartments in the pipe or section, which must of necessity leave a larger amount of material at some points than at others, producing an uneven drying of the sections, which draws the walls of the sections out of a true line or circle; and in burning the defect is further increased by the thinner portion being acted upon by heat much more than the thicker portions, increasing the tendency of the sections, as a whole, to become drawn or warped out of shape. These defects are entirely overcome and obviated by the present invention, in which the walls of the sections and the division-walls or partitions which form the passages or compartments are of a uniform thickness, and no increased body of material is formed either in the juncture of the walls or at other points, the result being that after the section has been formed into shape it can be set up for the purpose of drying or curing, and in curing one portion will not become dried in advance of another portion, as the drying will be even for all the walls, and when so dried the section will maintain an accurate and true shape; and the same result occurs in burning or vitrifying the section, as no part becomes baked before another.

In use one section is connected to another so as to bring the division-walls or partitions in line and produce a clear passage or compartment for the desired length of conduit or pipe, the sections being joined by connecting or coupling rings.

The form shown in Fig. 1 has seven passages or compartments, and that shown in Fig. 4 has four, and the number of compartments can be increased or diminished by increasing or diminishing the number of division-walls or partitions, and it will be seen that by using these division-walls or partitions not only are passages or compartments formed, but an interior support is furnished for the exterior wall, giving increased strength to such walls.

I am aware that it has been suggested in an English provisional specification, No. 488 of 1853, to make a sewer or drain pipe or tube of two thicknesses, or of one pipe or tube within the other, with an annular space between them, the outer and inner pipes or tubes being connected by narrow partitions, which run longitudinally along the annular space between them. It is stated that the object of such construction is to enable less material to be used in the formation of the pipe or tube, and to enable it to be more easily burned. The function or purpose of the narrow partitions between the two concentric tubes is not to form chambers adapted to be utilized for receiving and holding electric conductors or other objects, and it is an easily recognizable fact that the central tube or pipe subserves the ordinary function of a water or liquid conduit, and that the distance between the outer and inner tubes is very small, since narrow partitions are specified as being arranged in the annular space between the two tubes. Furthermore, there is no mention made in the case referred to of making the concentric tubes and the connecting partitions in one integral piece.

In my invention the partitions or walls radiate from a small central tube or from a solid center, and are molded in one piece with said central tube or solid center and the outer tube or wall of the conduit. By such formation I obtain great strength and other advantages recited in the foregoing description, and provide a conduit which has continuous segmental chambers between the tubular or solid center and the outer wall, such chambers being of such an area or capacity as to adapt them to receive electrical conductors and allow the latter to be introduced and removed with ease and facility. Furthermore, the concentric walls or shells of my conduit and the connecting-walls formed integral therewith are made of a uniform thickness or thereabout, so as to obtain a regular and thorough burning or curing of the conduit, as has already been mentioned.

What I claim as new, and desire to secure by Letters Patent, is—

1. A clay or earthenware conduit or pipe, consisting of an outer cylindrical shell and a series of straight longitudinal walls formed integral with said outer shell, and a central portion connecting said walls and also formed in one piece therewith, whereby segmental chambers are provided extending from the outer shell to the central portion, said chambers being of an area or capacity to receive and hold electrical conductors, substantially as described.

2. A clay or earthenware conduit or pipe, consisting of the outer cylindrical shell, the straight longitudinal walls, and the interior wall or center, all made or molded in one piece, and all of a uniform or nearly uniform thickness, substantially as described.

DANIEL N. HURLBUT.

Witnesses:
ALBERT H. ADAMS,
O. W. BOND.